US012509331B2

(12) United States Patent
Gilleman et al.

(10) Patent No.: US 12,509,331 B2
(45) Date of Patent: Dec. 30, 2025

(54) DEVICE FOR LIFTING A STEEL REINFORCEMENT MAT

(71) Applicant: THE ROBERTS BV, Nieuwpoort (BE)

(72) Inventors: Daan Gilleman, Maarkedal (BE); Jan Nouwen, Hellebecq (BE)

(73) Assignee: THE ROBERTS BV, Nieuwpoort (BE)

( * ) Notice: Subject to any disclaimer, the term of this patent is extended or adjusted under 35 U.S.C. 154(b) by 867 days.

(21) Appl. No.: 17/786,701

(22) PCT Filed: Dec. 7, 2020

(86) PCT No.: PCT/EP2020/084948
§ 371 (c)(1),
(2) Date: Jun. 17, 2022

(87) PCT Pub. No.: WO2021/122119
PCT Pub. Date: Jun. 24, 2021

(65) Prior Publication Data
US 2023/0032380 A1 Feb. 2, 2023

(30) Foreign Application Priority Data
Dec. 19, 2019 (BE) .................................. 2019/5944

(51) Int. Cl.
*B66C 1/40* (2006.01)
*B66C 1/42* (2006.01)
*B66C 1/62* (2006.01)

(52) U.S. Cl.
CPC . *B66C 1/42* (2013.01); *B66C 1/62* (2013.01)

(58) Field of Classification Search
CPC ............ B66C 1/42; B66C 1/62; E04G 21/169
See application file for complete search history.

(56) References Cited

U.S. PATENT DOCUMENTS 3,075,800 A * 1/1963 Rowekamp ............. B65B 21/12 294/90
3,180,671 A * 4/1965 Bachmann ................ B66C 1/62 294/81.61

(Continued)

FOREIGN PATENT DOCUMENTS

CH 694917 A5 9/2005
CN 202346591 U 7/2012

(Continued)

OTHER PUBLICATIONS

Chinese Office Action from Corresponding Chinese Patent Application No. CN202080088161.4, Jan. 11, 2025.

(Continued)

*Primary Examiner* — Emmanuel M Marcelo
(74) *Attorney, Agent, or Firm* — Workman Nydegger

(57) ABSTRACT

A device for lifting a steel reinforcement mat includes a grid of parallel rods in a first direction and, placed thereon and fastened permanently, parallel rods in a second direction, each according to a predetermined mesh width. The device has a hoisting frame suitable for being secured to a hoist. The hoisting frame has supporting elements on opposite sides positioned in such a way that when the hoisting frame rests on an uppermost steel reinforcement mat of a stack thereof, each supporting element is located in a respective mesh. The supporting elements are configured to slide in the first direction in such a way that during lifting, the supporting elements each support with a respective supporting surface exclusively rods in the second direction of exclusively the uppermost steel reinforcement mat. The supporting elements on the opposite sides slide away in the opposite direction to each other.

13 Claims, 15 Drawing Sheets

(56) References Cited

U.S. PATENT DOCUMENTS

| | | | | |
|---|---|---|---|---|
| 3,868,138 | A * | 2/1975 | Strombeck | B66C 1/28<br>294/81.62 |
| 3,947,064 | A * | 3/1976 | Skoting | B66F 9/12<br>294/67.4 |
| 6,513,847 | B2 * | 2/2003 | Harris | B66C 1/66<br>294/63.1 |

FOREIGN PATENT DOCUMENTS

| | | | | | |
|---|---|---|---|---|---|
| CN | 104692227 | A | | 6/2015 | |
| CN | 115030410 | A | * | 9/2022 | E04C 5/07 |
| DE | 202006004889 | U1 | * | 6/2006 | B66C 1/28 |
| GB | 2112447 | A | * | 7/1983 | B66C 1/62 |
| JP | 2000080796 | A | | 3/2000 | |
| NL | 1027861 | C2 | | 6/2006 | |
| NL | 2004719 | C2 | | 11/2011 | |
| WO | WO-2010068995 | A1 | * | 6/2010 | E04C 5/20 |
| WO | WO-2010080023 | A1 | * | 7/2010 | E04G 21/16 |
| WO | 2011142659 | A1 | | 11/2011 | |

OTHER PUBLICATIONS

Belgian Search Report from corresponding Belgian Application No. BE201905944, Sep. 14, 2020.

International Search Report from corresponding PCT Application No. PCT/EP2020/084948, Mar. 1, 2021.

* cited by examiner

DEVICE FOR LIFTING A STEEL REINFORCEMENT MAT

TECHNICAL FIELD

The invention relates to a device for lifting a steel reinforcement mat from a stack thereof. Prior art Concrete is a material that can withstand high compressive stresses, but that is unable to withstand tensile stresses of the same order of magnitude. That is, concrete has a far higher compressive strength than tensile strength, which makes the material unsuitable in structures in which forces are distributed proportionally over tensile and compressive stresses.

However, to make concrete suitable for such structures, it is combined with metal rods, also called reinforcing rods, which have a coefficient of expansion that is almost identical to that of concrete. This combined material, called reinforced concrete, can withstand both high compressive and high tensile forces.

Reinforcing of concrete can take place on site, for example on a building site, wherein the reinforcement rods are made to measure ad hoc by a concrete steel fixer, by shearing and bending them. However, this is a time-consuming task, so reinforcement is often prefabricated in a workshop and then transported to the building site.

An example of prefabricated reinforcement is a steel reinforcement mat. This is a grid of metal rods, wherein a first set of parallel rods form a plane, and a second set of parallel rods is fastened permanently on top of this, wherein the direction of the first set differs from that of the second set. The permanent fastening consists, for example, of a welded joint.

Depending on the way in which a steel reinforcement mat is fabricated, we then have a grid with square, rectangular or diamond-shaped meshes. It is usual, for example, for a steel reinforcement mat to comprise rods of identical diameters in each direction, the distances between the rods in one plane to be identical, and the directions to be at right angles to each other. We thus have a grid with square meshes, but another combination is also possible.

Because steel reinforcement mats are fabricated at a location that differs from the building site where they will be used as reinforcement, the maximum size of a steel reinforcement mat is limited for reasons of transportability. For steel reinforcement mats to be transported efficiently, they are stacked and the whole stack is transported to the building site. Then at the building site, each steel reinforcement mat is fetched from the stack separately, to be put in the place where it will serve for reinforcing the concrete.

However, even with limitation because of transportability, steel reinforcement mats can cover a large area, which leads to a very heavy weight. Thus, it is usually impossible to move even a single steel reinforcement mat merely by manpower in most situations, so that a hoisting device has to be used to effect movement.

An example of such a hoisting device is disclosed in WO2011142659A1, in which a hoisting device is discussed that is configured for lifting a single steel reinforcement mat from a stack. More specifically, the disclosed hoisting device comprises two parallel flexible elements movably suspended on a hoisting frame as well as coupling elements for coupling with a steel reinforcement mat. The coupling with a steel reinforcement mat takes place by allowing the flexible elements to bend in such a way that the coupling elements are coupled to the steel reinforcement mat. Decoupling then takes place according to a similar action, namely bending of the flexible elements again after the steel reinforcement mat is placed in the required location in the building site. According to one embodiment, the hoisting device further comprises locking hooks that can be operated by means of a handle fitted on an operating lever. With this handle and the operating lever, the device can be maneuvered and operated easily by two people.

However, it is a drawback that the device must be operated by two people, because these people must then be positioned both at the stack when a steel reinforcement mat is lifted from a stack, and at the location where the steel reinforcement mat is set down and where the mat has to be decoupled. Accordingly, the people have to keep moving about or extra workers have to be employed at the different locations.

A further drawback is that the decoupling takes place by bending the flexible elements again, because this means that the ends of the coupling elements rotate toward the surface on which the steel reinforcement mat is placed. As a result, the substrate of this surface or material applied thereon may be damaged.

Consequently there is a need for a device for lifting a single steel reinforcement mat from a stack safely and efficiently, wherein one or more of the above drawbacks are eliminated.

SUMMARY OF THE INVENTION

The present invention has the aim of providing a device for lifting a single steel reinforcement mat from a stack safely and efficiently, wherein the steel reinforcement mat can moreover be moved and then set down on a surface without damaging the substrate thereof.

According to a first aspect of the invention, this aim is achieved by providing a device for lifting a steel reinforcement mat comprising a grid of parallel rods in a first direction, called the longitudinal rods, and placed thereon and fastened permanently, parallel rods in a second direction, called the transverse rods, each according to a predetermined mesh width; the device comprising a hoisting frame suitable for being secured to a hoist; the hoisting frame comprising supporting elements on opposite sides, positioned in such a way that when the hoisting frame rests on an uppermost steel reinforcement mat of a stack thereof, each supporting element is located in a respective mesh; and in which, moreover, the supporting elements are configured to slide in the first direction, so that during lifting, the supporting elements each support, with a respective supporting surface, exclusively rods in the second direction of exclusively the uppermost steel reinforcement mat. The supporting elements may for example be formed as L-shaped or hook-shaped with dimensions and distances apart that make it possible for the supporting elements to project simultaneously through respective meshes of the steel reinforcement mat, and a horizontal sliding motion of the supporting elements in the longitudinal direction is sufficient to push the approximately horizontal part of the L-shape or the hook under respective transverse rods. The supporting elements then support the steel reinforcement mat during lifting, and can at the same time clamp the steel reinforcement mat in the longitudinal direction. The clamping or unclamping of the steel reinforcement mat in the longitudinal direction will be controlled by the operator, who controls the horizontal motion of the supporting elements and can thus push these supporting elements farther apart (clamping of the steel mat) or can push them closer together (unclamping of the steel mat).

The device comprises a hoisting frame suitable for being secured to, for example, a building crane, a machine with a jib, a crane mounted on a truck, a trailer, or any other hoisting machine. The hoisting frame is moreover suitable to be placed or set down on a steel reinforcement mat.

A steel reinforcement mat is a grid of parallel rods in a first direction, on which parallel rods in a second direction are placed and fastened permanently. The first direction is, for example, at right angles to the second direction, and the permanent fastening between two rods is, for example, produced by means of a weld. The steel reinforcement mat is thus a grid with meshes, which can be lifted as a whole. The size of the meshes depends on the mesh width in both directions. When a steel reinforcement mat is set down on a surface, rods in the first direction will rest on the surface, whereas rods in the second direction rest on the rods in the first direction without touching the surface. Moreover, the distance between the plane formed by the underside of the rods in the second direction and the surface on which the steel reinforcement mat is placed is equal to the thickness or diameter of the rods placed in the first direction.

Different steel reinforcement mats can also be stacked on each other, wherein rods in the first direction of an uppermost steel reinforcement mat are placed on rods in the second direction of a bottommost steel reinforcement mat, and wherein the rods of the different steel reinforcement mats in the first direction lie parallel to one another. Therefore the rods of the different steel reinforcement mats in the second direction will also lie parallel to one another. According to this manner of stacking, the distance between planes is determined by on the one hand the upper side of rods in the first direction and on the other hand the underside of the rods in the same direction of the first upper steel reinforcement mat equal to the thickness or diameter of the rods placed according to the second direction, and vice versa.

The hoisting frame further comprises supporting elements on opposite sides of the hoisting frame. The supporting elements have for example an L-shape or hook shape and they each comprise a respective supporting surface, which will be used for supporting the steel reinforcement mat during lifting. The supporting surface is thus for example the upper surface of the horizontal part in the case of an L-shape, or the upper surface of the hook. These supporting elements are movable in the first direction, the longitudinal direction, and are dimensioned so that when the hoisting frame is placed on a steel reinforcement mat, wherein the steel reinforcement mat itself lies on a surface or on a stack, the supporting elements pass through into meshes of the steel reinforcement mat on which the hoisting frame comes to rest. In addition, the distance between the supporting elements is such that the different supporting elements each pass through into a respective mesh without touching a rod. The distance between supporting elements on opposite sides is for example a whole multiple of a mesh width in the direction defined by this distance, and mutatis mutandis for supporting elements on one and the same side. Supporting elements on opposite sides are typically movable in the opposite sense in the longitudinal direction, so that the steel reinforcement mat can be clamped in the longitudinal direction.

Accordingly, when the hoisting frame is placed on the uppermost steel reinforcement mat and then rests on rods placed according to the second direction, the supporting elements following the first direction push under the rods in the second direction in such a way that these last-mentioned rods can be propped up or supported by the supporting surfaces. Moreover, in one possible embodiment, the thickness of the supporting elements, i.e. the distance between the bottom of a supporting element and the supporting surface, is smaller than the thickness or diameter of the rods placed in the first direction (longitudinal rods) so that individual rods in the second direction (transverse rods) of the uppermost steel mat are touched when the supporting element slides under it. In other words, therefore the supporting elements do not in principle touch any transverse rods of the underlying steel mat.

The hoisting frame can simply be placed on a steel reinforcement mat, wherein it is only necessary to ensure that the supporting elements penetrate each other in a respective mesh. Because the distances of the supporting elements are adjusted to the mesh width both on an identical side and on opposite sides, the hoisting frame only has to be held parallel to and above the steel reinforcement mat, wherein, initially, a single supporting element must be located above a mesh. Then the frame can be turned in the plane defined by the underside of the supporting elements so that each supporting element is positioned above a mesh. Then the hoisting frame can be lowered until it rests on the steel reinforcement mat. This manoeuvring can be done easily by one person. This is an advantage because this operation can then take place, for example, by means of a hoisting machine coupled to the hoisting frame and operated from a cabin.

A further advantage is that the hoisting frame can rest on a steel reinforcement mat without touching a bottommost steel reinforcement mat, or a surface on which the steel reinforcement mat might rest. Therefore an operator will not in principle cause any damage to it. It is to be noted that when gripping the last steel reinforcement mat of a stack and on the assumption that this steel reinforcement mat is oriented so that the transverse rods are at the bottom and the longitudinal rods at the top, the supporting elements will scrape well over the bottom during the horizontal motion.

Yet another advantage is that the supporting elements are movable in a direction determined by the plane of the supporting surfaces and do not rotate in this plane. Therefore there will also be no damage of the surface under the steel reinforcement mat when the hoisting frame is used. It should also be pointed out that during gripping of the last steel reinforcement mat of a stack and on the assumption that this steel reinforcement mat is oriented in such a way that the transverse rods are at the bottom and the longitudinal rods are at the top, the supporting elements will scrape well above the bottom during the horizontal motion, even if it is not rotated.

Furthermore, the steel reinforcement mat can then simply be lifted from a stack and be moved to another location, wherein the other steel reinforcement mats remain in the stack. Once again, this can be done by one person, for example from a cabin, and the steel reinforcement mat can be set down, wherein there is also no contact with the surface on which the mat is placed. Finally, when the steel reinforcement mat is set down, it rests on the rods placed in the first direction, so that the supporting elements can be fetched in a reversed sliding motion from under the rods in the second direction. It is thus an advantage that the steel reinforcement mat does not have to be unloaded from a certain height, but that the mat as a whole can first be set down before removing the hoisting frame. As a result, the steel reinforcement mat can be placed in a correct position without any danger of it still moving after the supporting elements slide away. Here too, it is assumed that the steel reinforcement mat is oriented in such a way that the transverse rods are at the top and the longitudinal rods are at the bottom. If a steel reinforcement mat has the opposite orientation—with transverse rods at the bottom and longitudinal rods at the top—then when setting down the steel reinforcement mat on a floor and pushing the supporting elements horizontally toward each other, the bottom of these supporting elements will scrape over the floor and the upper surface of the supporting elements will remain in contact with the transverse rods, so that there can still be a limited movement of the steel reinforcement mat.

According to an advantageous aspect, supporting elements slide away from each other in the opposite direction on the opposite sides.

The sliding elements slide in the first direction, wherein the direction of opposite supporting elements is opposite on different sides and they slide away from each other when the respective supporting surfaces slide under the rods. As a result, the steel reinforcement mat that is supported is clamped toward the outside. One advantage of this is that sagging of the steel reinforcement mat during lifting and transport is reduced by the forces that are exerted outward by means of the supporting elements.

According to one embodiment, the device further comprises a coupling configured for connecting the hoisting frame to the hoist.

In an advantageous embodiment, a mobile coupling in the form of a rotator on the end of a crane jib is connected rigidly to a component of the lifting mechanism, namely a bush provided on the lifting mechanism. This bush can then preferably move a second bush, which forms part of the lifting mechanism, in and out in the longitudinal direction. In other words, the hoisting frame is connected via a bush to a rotator of the hoist with which steel reinforcement mats are raised. By means of this connection, oscillating movements are avoided, or for example limited to situations in which a transverse rod would break away or come loose and the steel reinforcement mat can still be left dangling, so that the steel reinforcement mat can be moved safely, thus increasing general safety on the building site. In addition, a further advantage is that an operator has more precise control of the steel reinforcement mat compared to a loose connection by means of, for example, chains, so that the steel reinforcement mat can be set down more easily in a required location. The hoisting mechanism is for example a building crane. The rotator then forms part of the building crane. The rotator can allow the lifting mechanism or grab to turn. Up and down movement is obtained by pressing the crane jib further downward when the lifting mechanism is on the stack of steel reinforcement mats or on the ground (inward pushing motion) or by moving the crane jib upward: only then, an outward sliding motion of the bush will occur, after which the lifting mechanism is raised by the building crane.

A rotator on the end of the arm of the crane offers the advantage that when a steel reinforcement mat is raised, this can turn in a sense of rotation square or perpendicular to the plane defined by the steel reinforcement mat. As a result, an operator has greater flexibility for placing the steel reinforcement mat in a required location. Rotation also ensures that the hoisting frame can be positioned correctly above a steel reinforcement mat, that is, each supporting element above a mesh, then allowing it to go down on the mat.

According to one embodiment, the distance between the supporting elements is adjustable.

The supporting elements or hooks can be selected and placed beforehand, as a function of the wire gauge and the mesh width of the steel reinforcement mat. In an advantageous embodiment of the hoisting device according to the present invention, the distance between the supporting elements is adjustable in the first and/or second direction. As a result, the hoisting frame is universal for steel reinforcement mats with different mesh width between rods placed in the first and/or second direction. One and the same hoisting frame can then be used for lifting different types of steel reinforcement mats.

According to one embodiment, a supporting element comprises a border at right angles to one side of its respective supporting surface.

A supporting element slides under a rod so as to be able to support it with the supporting surface during lifting. The border that is at right angles to this supporting surface on one side then ensures that during sliding, the supporting surface remains under the rod, because the border presses against this rod when the supporting element slides under it, and so is not pushed farther away from the rod. An operator therefore has a reference point so as to be able to estimate that a respective supporting element is pushed far enough under a rod. In addition, the border further ensures that a raised steel reinforcement mat cannot slide off in a direction toward the border. The border may also help to clamp the steel reinforcement mat in the longitudinal direction during lifting.

According to one embodiment, a supporting element further comprises interlocking configured to lock a supported rod.

Thus, after a supporting element has been pushed under a rod, this rod can be locked by the interlocking. This interlocking is, for example, a pin operated by a hydraulic cylinder, which closes the opening of the hook or supporting element as soon as the rod is located therein. As a result, the steel reinforcement mat is fixed safely on the hoisting frame, preventing falling during movement.

According to one embodiment, the interlocking is a locking pin movable at right angles to the supporting surface and configured for closing the opening of the supporting element in which the supported rod is located. The end of the pin fits into a hole or recess provided in the supporting surface of the supporting element, so that the pin finds extra support there if necessary because of forces exerted by the supported rod, for example.

The pin that is used for opening or closing the hooks can be operated hydraulically. An internal hydraulic circuit can be provided for opening and closing the pins. Said internal hydraulic circuit consists for example of 2 pump cylinders and 4 spindle cylinders (2 spindle cylinders per pump cylinder). The pressing-in of the fastening point by the rotator is utilized for pressing the pump cylinders in, so that they release the hydraulic fluid and build up pressure in the circuit so that the spindle cylinders and thus also the safety pins are raised. Conversely, when raising the lifting mechanism, the pump cylinder will slide out again, so that the pressure in the circuit decreases and the spindle cylinders (and thus also the safety pins) close before the lifting mechanism lifts the steel reinforcement mat away from the ground or from the stack. Other techniques for moving the pins or pressure elements up and down may of course be used in variant embodiments of the hoisting device according to the invention. Thus, spring pressure, electromagnetism, pneumatic or mechanical drives may be considered for making the upward and/or downward motion of the pins or pressure elements possible.

According to one embodiment, sliding of the supporting elements takes place hydraulically.

A hydraulic circuit of the device can then be connected to the hydraulic circuit of a hoist with which the device is operated. The device can thus simply be operated from a distance, for example in a cabin, so that an operator can lift a steel reinforcement mat from a stack easily and safely in order to move it. Alternatives to a hydraulic circuit are for example a pneumatic circuit (which is connected to a pneumatic circuit of the hoist), an electromagnet, a mechanical transmission, etc. In particular embodiments, the supporting elements may also be moved "on the fly", i.e. during lifting of a steel reinforcement mat. The locking pins open singly per structure at the moment when the steel reinforcement mat is set down by the grab on the stack or on a surface and by compressing the central shaft. There is thus mechanical-hydraulic conversion of the motion, wherein the relative motion of the central shaft with respect to the grab is converted into hydraulic energy, which in its turn is converted by means of the cylinders into a mechanical motion of the locking pins. However, alternative embodiments are conceivable, for example such as an embodiment in which the opening and closing of the locking pins takes place electromechanically. A combination of safe sensors can for example detect that the grab is on the ground or on a stack of reinforcement mats and monitor a redundant arrangement of electromagnets by means of a safety PLC. More generally, it can be stated that the motion of the locking pins, the motion of the supporting elements and/or the motion of the central shaft of the hoisting device can be effected by other mechanisms and/or by using other energy sources than those described above. It should also be noted that the in and out sliding movements of the supporting elements, the locking pins and/or the central shaft—which take place as linear movements in the embodiments described above—may in variant embodiments be executed as pivoting or rotating, while adhering to the principles of the present invention.

According to one embodiment, the device further comprises a base, configured to be secured to the hoisting frame in such a way that the hoisting frame rests on the steel reinforcement mat by means of the base exclusively.

The hoisting frame may thus be equipped at the bottom with one or more bases, which are blocks of a harder material, for example hard steel, because during downward motion of the hoisting device, only these bases come into contact with the steel reinforcement mat. Each base will have a shape and dimensions that make it impossible for the base to pass through the meshes of the steel reinforcement mat. The hooks or so-called supporting elements will also preferably be made of a harder material. The base or bases may preferably be placed centrally between the supporting elements. In such an embodiment, the bases are located relatively far from the place where the supporting elements will grip the transverse rods, with the possible consequence that because of deviations or angled setting, a transverse rod is not gripped. In an alternative embodiment it would therefore be possible to place the bases outside the supporting elements, with the drawback that steel reinforcement mats that are stacked alternately can then no longer be turned (a problem that only arises for steel reinforcement mats with a rod diameter of 8 millimeter or smaller because only these are typically delivered with alternating orientation, the transverse rods being at the top for one mat and the transverse rods at the bottom for the next mat in the stack). In yet another embodiment, the bases may be integrated in the supporting elements.

According to one embodiment, the height of the base is adjustable in such a way that the distance between the underside of the base and the upper side of the supporting surfaces is at least equal to the thickness of the rods in the second direction.

This height determines the distance between the plane defined by the supporting surfaces and the underside of the base that rests on the mat. This distance thus determines what thickness of rods can be supported without touching other rods. Because the height is adjustable, the device is therefore suitable for supporting rods with different diameters or thicknesses. If the base is placed higher, it will be possible for steel reinforcement mats with thicker rods to be lifted. If the base is placed lower, steel reinforcement mats with thinner rods can also be lifted without the risk of two or more steel reinforcement mats being taken from the stack at the same time.

According to one embodiment, the device further comprises one or more magnets configured to attract the corners of the steel reinforcement mat.

In fact, magnets may optionally, for example, be placed at the four ends of the hoisting frame. The optional magnets then attract the corners of the steel reinforcement mat, so that the supporting elements slide more easily under the rods of the steel reinforcement mat, for example in situations where the middle of the stack of steel reinforcement mats is higher than the corners of the stack of steel reinforcement mats.

According to one embodiment, the magnet is an electromagnet or a mechanically controlled lifting magnet.

Accordingly, the magnet can be controlled to attract the steel reinforcement mat when this is necessary, for example during lifting, and the magnet can be switched off when the steel reinforcement mat has been set down at the right location. However, electromagnets require an electrical supply. Subject to adjustment of the crane—the hoist—and an adequate energy flow, the magnets may be configured as electromagnets. An alternative is to use workshop magnets or lifting magnets that are switched on and off hydraulically or mechanically.

According to one embodiment, the hoisting frame comprises two parallel beams connected by means of a connecting frame comprising the coupling, wherein the parallel beams comprise a supporting element at each end.

In one embodiment, the device thus consists of two parallel beams with supporting elements at each end for lifting a steel reinforcement mat. The beams are then joined together by a connecting frame that further comprises the coupling for connecting the device to a hoist. Then, during lifting, the operator can endeavour to achieve symmetrical positioning of the supporting elements, so that when a steel reinforcement mat is raised, the forces are distributed uniformly over the different supporting elements and moreover are distributed uniformly over the beams.

According to a second aspect of the invention, a hoist is provided comprising the device according to the first aspect.

The hoist is for example a building crane, a telescopic handler, a lifting mechanism or any other hoisting machine suitable for moving material at a building site.

BRIEF DESCRIPTION OF THE DRAWINGS

The invention will now be described further with reference to the drawings, in which.

DESCRIPTION OF EMBODIMENTS

Figure 1A:
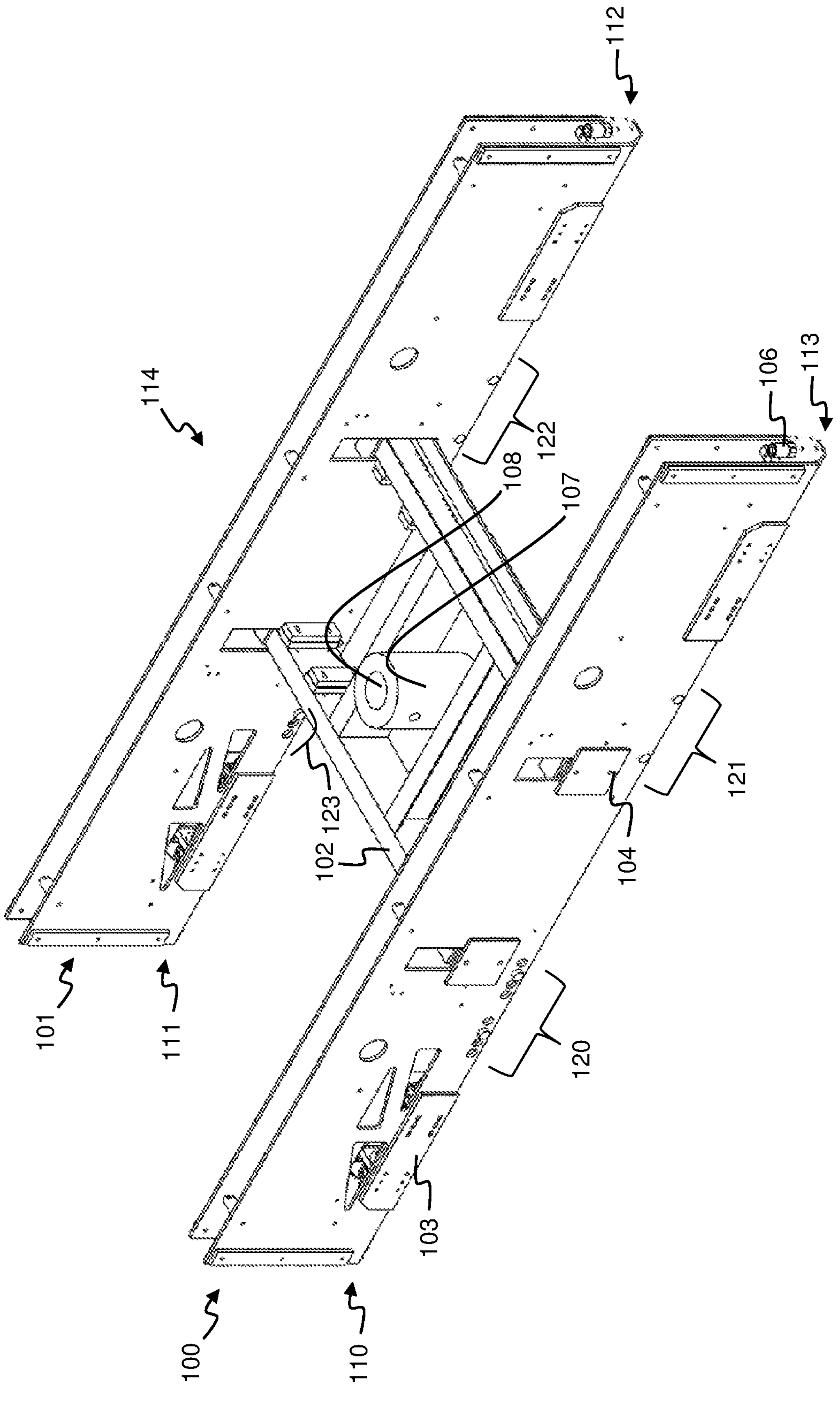
FIG. 1A shows schematically a device for lifting a steel reinforcement mat according to a first embodiment of the invention.

FIG. 1A shows schematically a first embodiment of the device for lifting a steel reinforcement mat according to the present invention. The device 114 comprises two parallel beams 100 and 101 and a connecting frame 102, which connects the parallel beams 100 and 101 to one another by means of, for example, a plate joint, such as plate joint 104. Other connections, for example such as a welded joint, are also possible. The parallel beams 100 and 101 together with the connecting frame 102 together form a hoisting frame that further comprises a coupling 107 suitable for securing the hoisting frame to a hoist, for example such as a building crane. In the first embodiment, the beams 100 and 101 are movable with respect to the connecting frame 102.

Figure 1B:
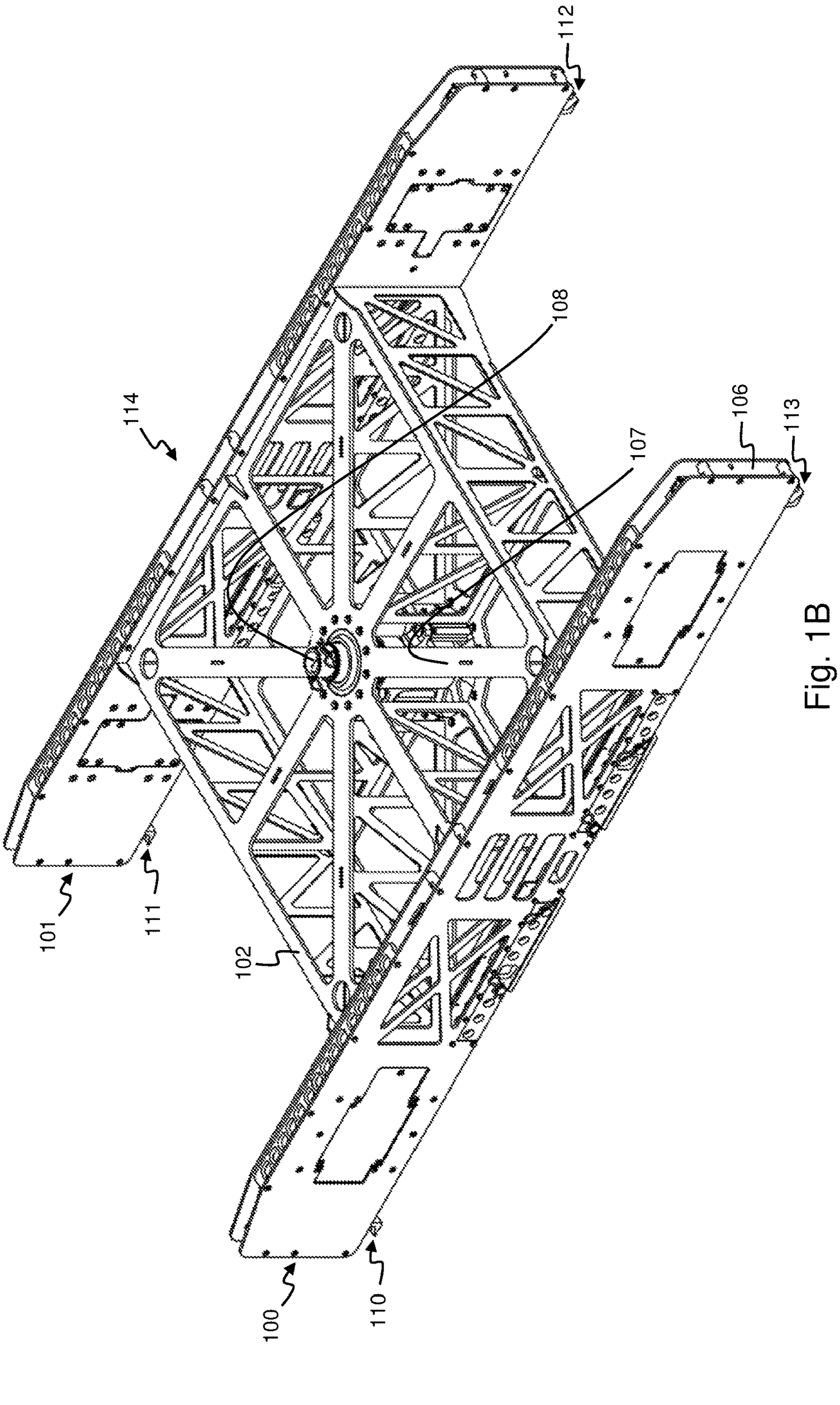
FIG. 1B shows schematically a device for lifting a steel reinforcement mat according to a second embodiment of the invention.

FIG. 1B shows schematically a second embodiment of the device for lifting a steel reinforcement mat according to the present invention. Corresponding elements in FIG. 1A and FIG. 1B are indicated with one and the same reference. In the embodiment of the device 114 that is shown in FIG. 1B, the parallel beams 100 and 101 and the connecting frame 102 form a rigid whole. The degree of freedom in the Z-direction is realized in this second embodiment at the level of the coupling 107, the central shaft 108 of which is designed to be extendable. During setting down of a steel reinforcement mat, the central shaft 108 will be pressed in under the weight of the hoist, and will be pushed out during lifting of a steel reinforcement mat. The second embodiment illustrated in FIG. 1B allows steel reinforcement mats that are stacked alternately—i.e. steel reinforcement mats that are stacked alternately with the transverse rods downward and with the transverse rods upward—to turn a steel reinforcement mat round and give it the same orientation as the steel reinforcement mat beneath it, for example with the transverse rods upward. This requires two operations: the steel reinforcement mat to be turned is first raised on the side with projecting rods, by means of two supporting elements, for example 112 and 113, so that the steel reinforcement mat is dangling; then the steel reinforcement mat, correctly oriented, is taken off onto the ground. Then the lifting mechanism will be rotated 90°—for example by means of a rotator on the hoist—and the steel reinforcement mat is raised, this time making use of the four supporting elements 110-113.

Figure 2A:
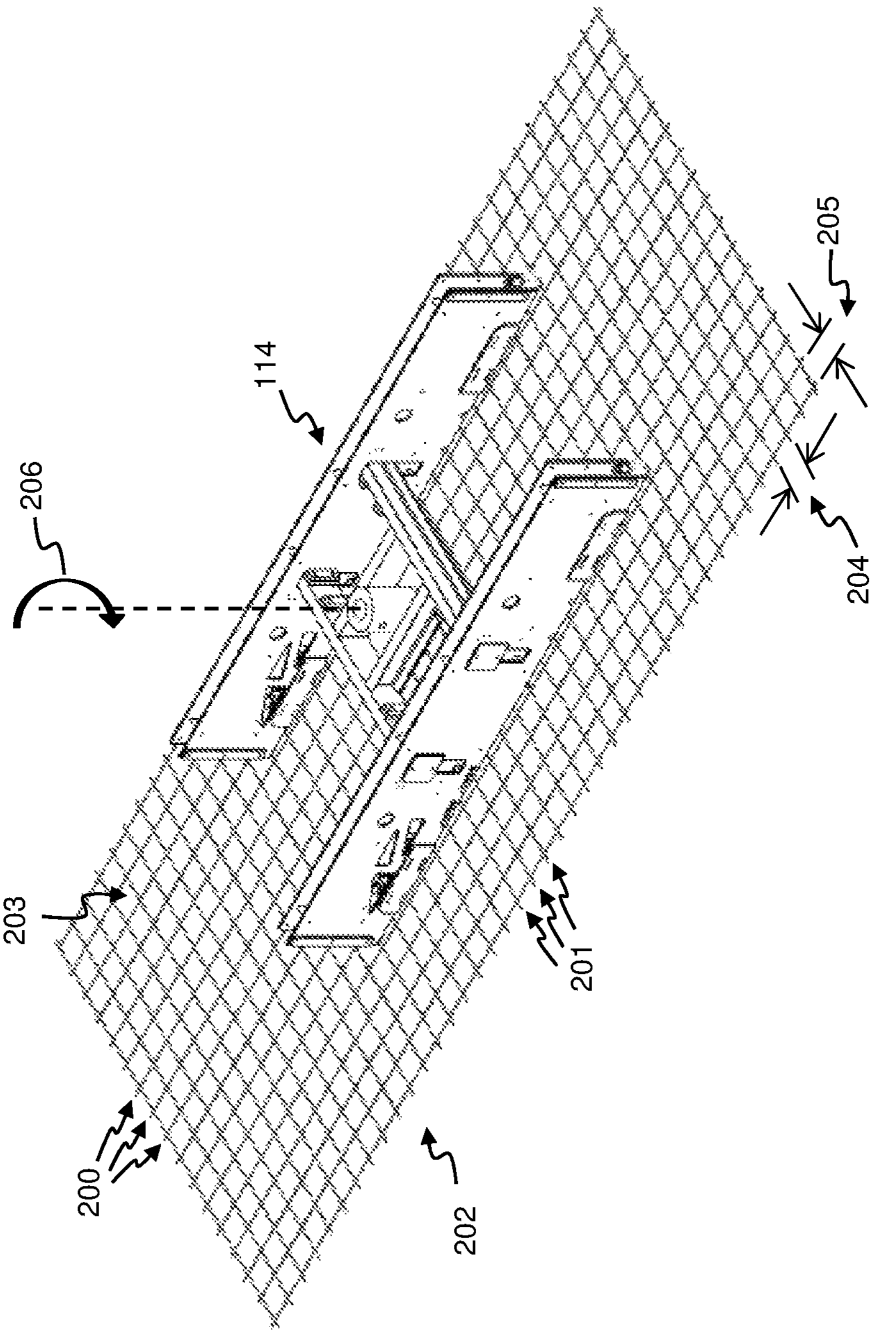
FIG. 2A shows schematically the device according to FIG. 1A placed on a steel reinforcement mat according to the first embodiment of the invention.
Figure 2B:
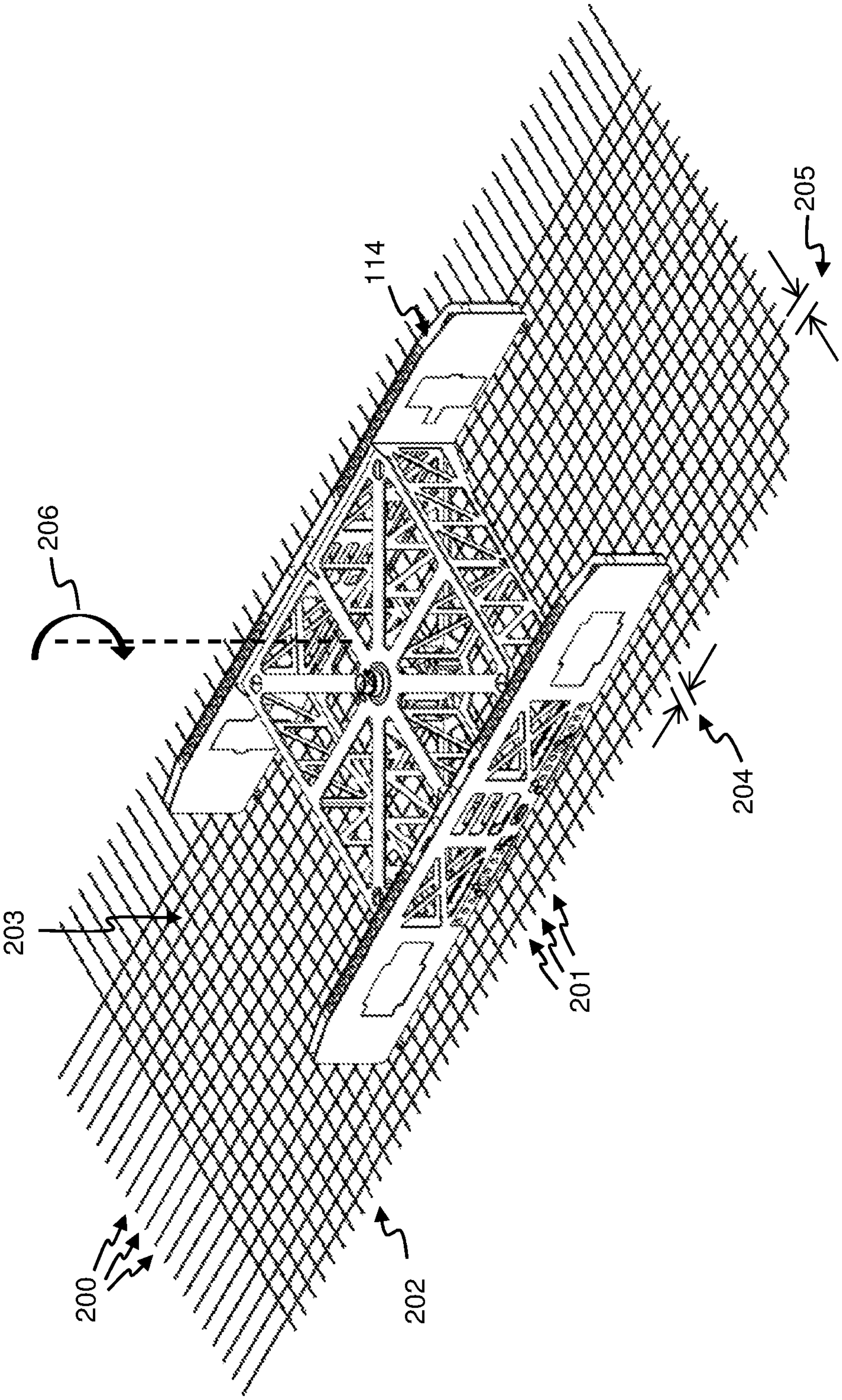
FIG. 2B shows schematically the device according to FIG. 1B placed on a steel reinforcement mat according to the second embodiment of the invention.

The device 114 is suitable for resting on a steel reinforcement mat. FIG. 2A illustrates the first embodiment of the device 114, the embodiment in FIG. 1A, placed on a steel reinforcement mat 202. FIG. 2B illustrates the second embodiment of the device 114, the embodiment in FIG. 1B, placed on a steel reinforcement mat 202. The steel reinforcement mat 202 comprises a grid of parallel rods 200 and 201. A first set of parallel rods is placed in a first direction, as illustrated by rods 200, called the longitudinal direction. In another direction, for example at right angles to this, called the transverse direction, a second set of parallel rods is placed, as illustrated by rods 201.

Figure 5:
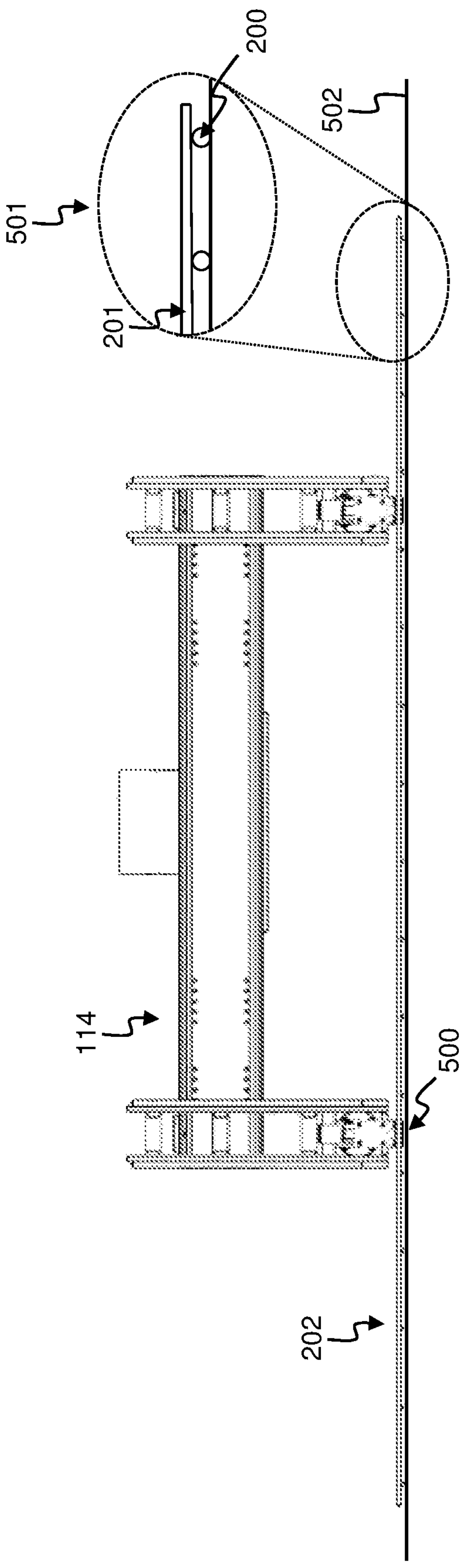
FIG. 5 shows schematically a device during setting down of a steel reinforcement mat on a surface according to one embodiment of the invention.

The steel reinforcement mat 202 may, for example, lie on a surface, as illustrated in FIG. 5. The steel reinforcement mat 202 will then, for example, serve as reinforcement for a concrete floor. The surface 502 is for example a foundation on a building site, on which a layer of concrete will be cast, after the steel reinforcement mat 202 has been set down thereon.

When the steel reinforcement mat 202 is lying on the surface 502, rods in one direction, for example the first direction 200, will come into contact with the surface 502, whereas rods in the other direction, the second direction 201, lie on top of the rods in the first direction 200 and do not come into contact with the surface 502. In other words, there will be a height difference between the rods 201 placed in the second direction and the surface 502. This is illustrated by detail 501 in FIG. 5.

Figure 4:
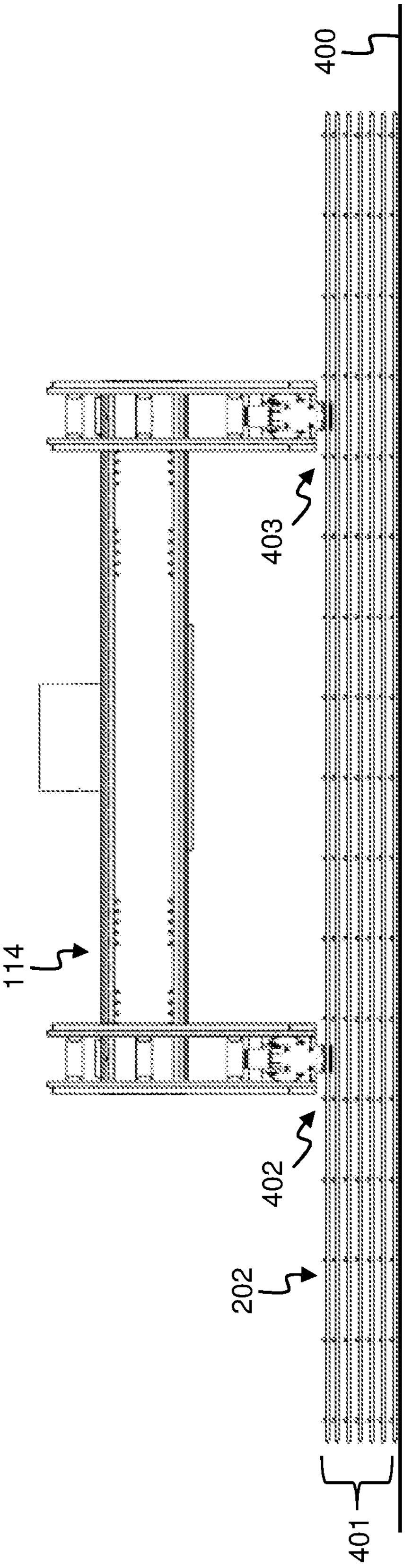
FIG. 4 shows schematically a device for lifting a steel reinforcement mat from a stack thereof according to one embodiment of the invention.

The steel reinforcement mat 202 can also be stacked with other steel reinforcement mats on a stack 401, as illustrated in FIG. 4. The stack 401 of steel reinforcement mats then contains steel reinforcement mat 202, which lies at the top of stack 401. The stack then lies on surface 400.

The rods placed in the first direction 200 lie parallel to one another and a predetermined distance apart, also called mesh width 205. The rods placed in the second direction 201 also lie parallel to one another and at a predetermined mesh width 204. Mesh width 205 may be identical to mesh width 204, so that the steel reinforcement mat comprises square meshes, for example such as mesh 203. The mesh widths 204 and 205 may also differ from one another, giving rectangular meshes.

The device 114 further comprises supporting elements 110-113 on opposite sides. According to the first embodiment illustrated in FIG. 1A and the second embodiment illustrated in FIG. 1B, the device 114 comprises four supporting elements, namely 110, 111, 112 and 113. The supporting elements 110 and 111 are considered to lie on one and the same side, and this also applies to supporting elements 112 and 113. The supporting elements 110 and 113 are considered to lie on opposite sides, which also applies to supporting elements 111 and 112. The supporting elements 110-113 are configured to slide in one and the same direction, more specifically in the longitudinal direction of the parallel beams 100 and 101.

The device 114 is placed on the steel reinforcement mat 202 in such a way that the longitudinal direction of the parallel beams 100 and 101 corresponds to one of the two directions in which the rods are placed. According to the schematic representation in FIG. 2A and FIG. 2B, the device 114 is placed on the steel reinforcement mat 202 in such a way that the longitudinal direction of the beams 110 and 111 lies in the same direction as the rods 200 in the longitudinal direction. This is illustrated further in FIG. 3A for the first embodiment of the device 114 and FIG. 3B for the second embodiment of the device 114, in which the device 114 on the steel reinforcement mat 202 is in each case illustrated from a top view.

Figures 7A, 7B:
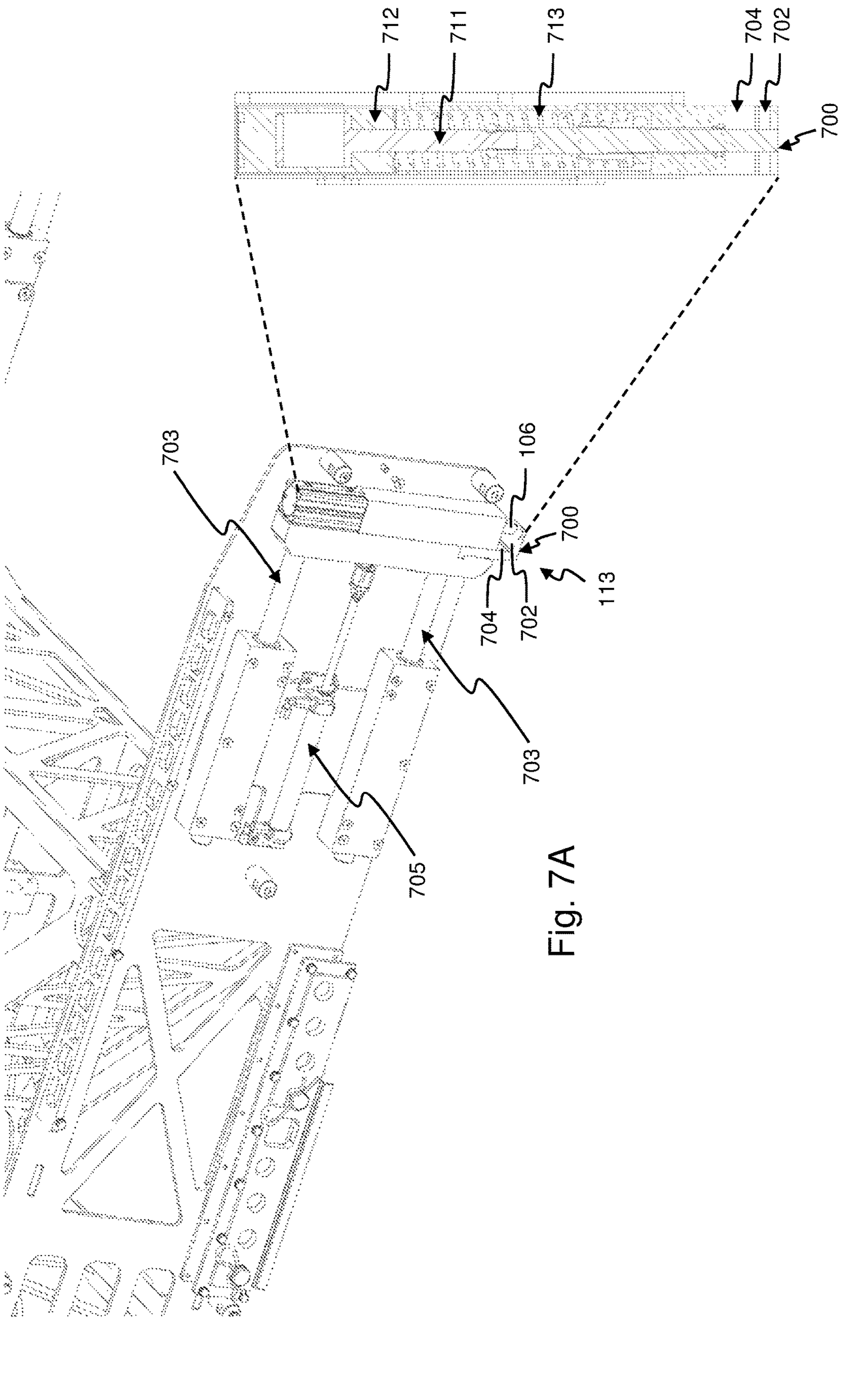
FIG. 7A and FIG. 7B show schematically a detail of a supporting element of the device according to one embodiment of the invention.

The supporting elements 110-113 comprise a supporting surface and, according to one embodiment, an interlock, as illustrated in FIG. 7A. Here, a detail of supporting element 113 is illustrated, comprising a supporting surface 702, an underside 700, interlock 106, and a border 704. FIG. 7B shows further details of the interlock 106. In one embodiment, this interlock 106 comprises a spindle 711, a spindle cylinder 712 and a spring 713.

Figure 6:
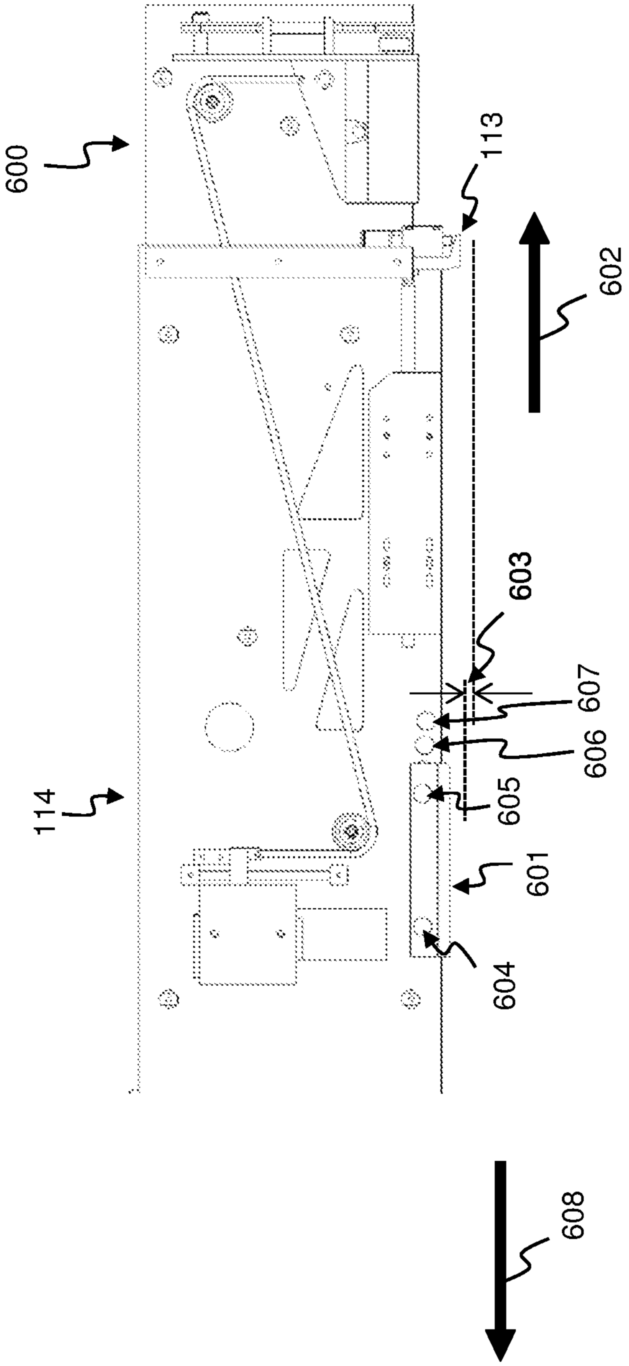
FIG. 6 shows schematically a detail of the device comprising a base according to one embodiment of the invention.

The supporting elements 110-113 are, moreover, positioned in such a way that the mutual distances between them allow the device 114 to be placed on the steel reinforcement mat 202 in such a way that each supporting element 110-113 is located in a mesh of the steel reinforcement mat 202. Moreover, when the supporting elements 110-113 are located in a respective mesh, in a starting position they do not touch a rod in the first direction 200, nor a rod in the second direction, nor a surface under them. Therefore the hoisting frame of the device 114 rests on the steel reinforcement mat 202. According to one embodiment, the device 114 further comprises a base 601 as illustrated in FIG. 6, which may be used to allow the device 114 to rest on the steel reinforcement mat 202.

The base 601 is configured for setting the distance 603 between the bottom of the base 601 when secured to the device 114 and the bottom of the supporting elements 110-113. This distance 603 should be at least equal to the thickness of the rods placed in the direction at right angles to the longitudinal direction of the beams 100 and 101, thus in the schematic illustration in FIG. 2A-2B and FIG. 3A-3B in direction 201 in such a way that these rods can be supported when the supporting elements 110-113 slide under these rods 201.

In order to place the device 114 stably and allow it to rest on the steel reinforcement mat 202, according to one embodiment four bases are provided, more specifically two per beam 100-101, at positions 120-123. Each base, such as base 601, can be secured to the device 114 by placing connecting pieces, such as connecting pieces 604 and 605, in specially provided openings of a respective beam 100-101, wherein one and the same opening is provided in the bases themselves, such as for base 601. More specifically, base 601 is secured to the device 114 via two cross-bars 604 and 605.

In order to set the height of the base 602, in other words the distance 603, various openings, which lie at different distances relative to the underside of the device 114, are provided in the beams 100-101. Said openings are illustrated by 606 and 607, each of which is provided at a different distance with respect to the underside of the device 114. Thus, with regard to cross-bar 605, the base 601 can be secured to the device via opening 606 or 607. The other cross-bar 604 then comes in another opening, so that the base 601 is connected to the device 114 via the two bars 604-605. Openings for securing the base 601 are illustrated further by the openings in position 120 in FIG. 1A.

Figure 3A:
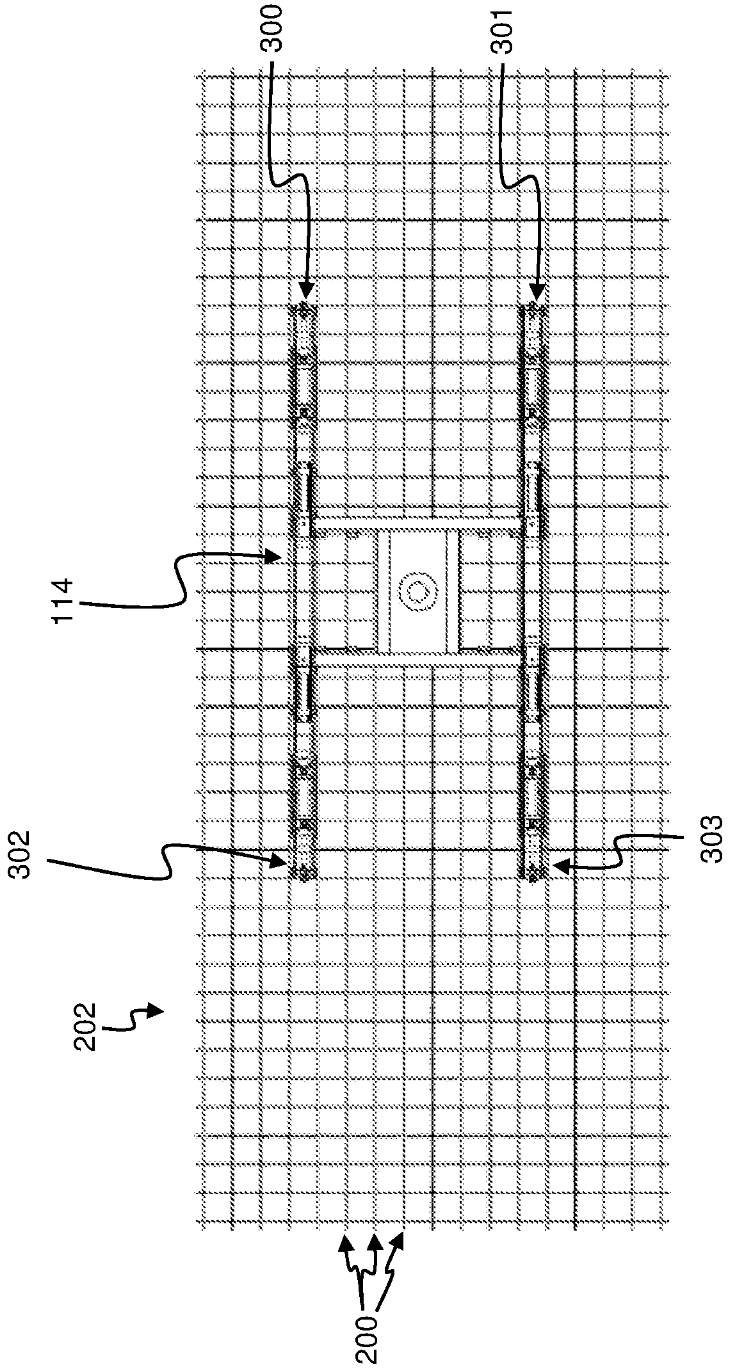
FIG. 3A is a schematic top view of the device according to FIG. 1A on the steel reinforcement mat.
Figure 3B:
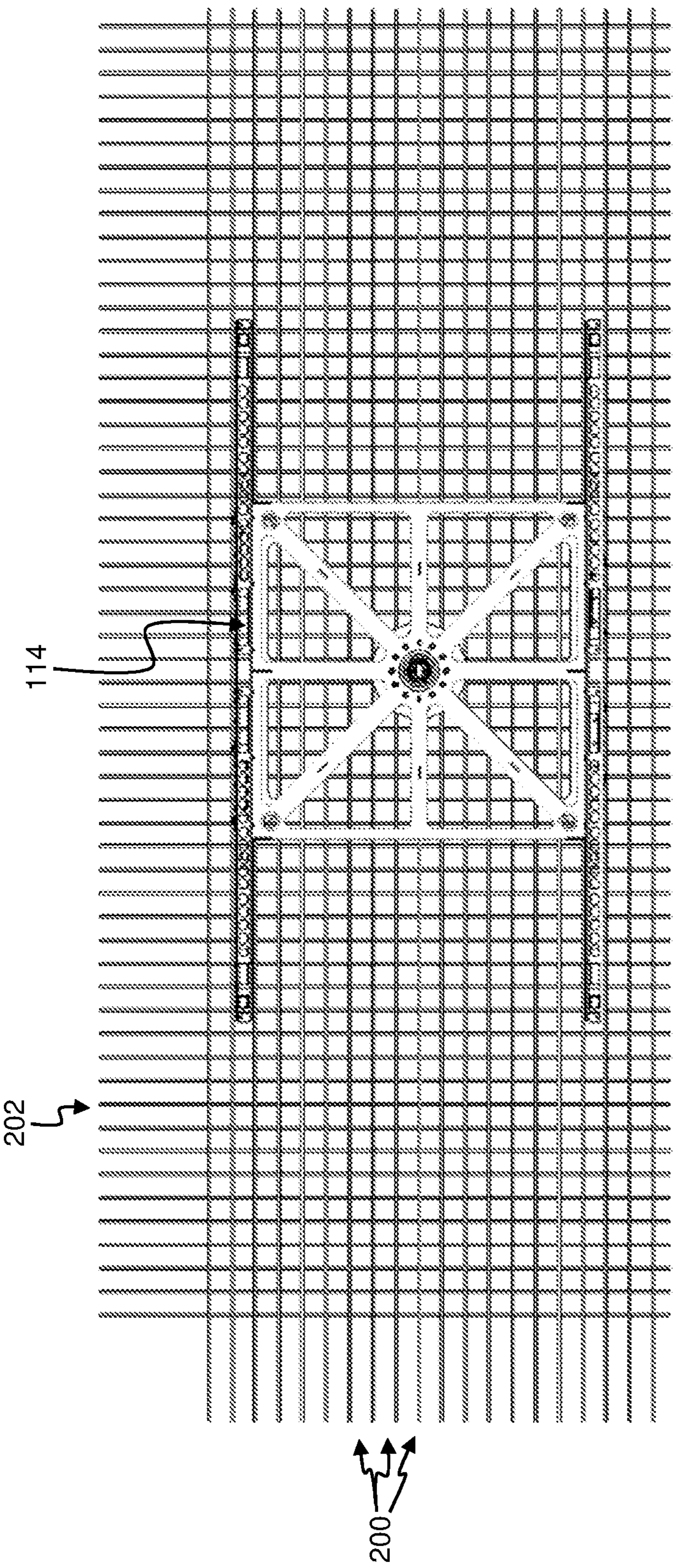
FIG. 3B is a schematic top view of the device according to FIG. 1B on the steel reinforcement mat.

The device 114 is thus placed on the steel reinforcement mat 202 in such a way that the ends of the beams 100-101, and more specifically the supporting elements 110-113 are located above a mesh, as illustrated with positions 300-303 in FIG. 3A. Then the device 114 is lowered onto the steel reinforcement mat 202, so that the bases rest thereon, and each supporting element 110-113 is located in a mesh. This is illustrated further in FIG. 4 by references 402 and 403.

The supporting elements 110-113 are located in a respective mesh and owing to the distance 603, the underside of a supporting element, for example underside 700 of supporting element 113, is located not lower than the plane defined by the upper side of the rods placed in direction 200 of the first underlying steel reinforcement mat under steel reinforcement mat 202 of the stack 401.

Then the supporting elements 110-113 slide outward, i.e. in the sense illustrated by 602 for supporting element 113, and the sense 608 for supporting element 110. Sliding thus occurs in an identical direction, but opposite sense for supporting elements that are located on opposite sides.

Figure 9A:
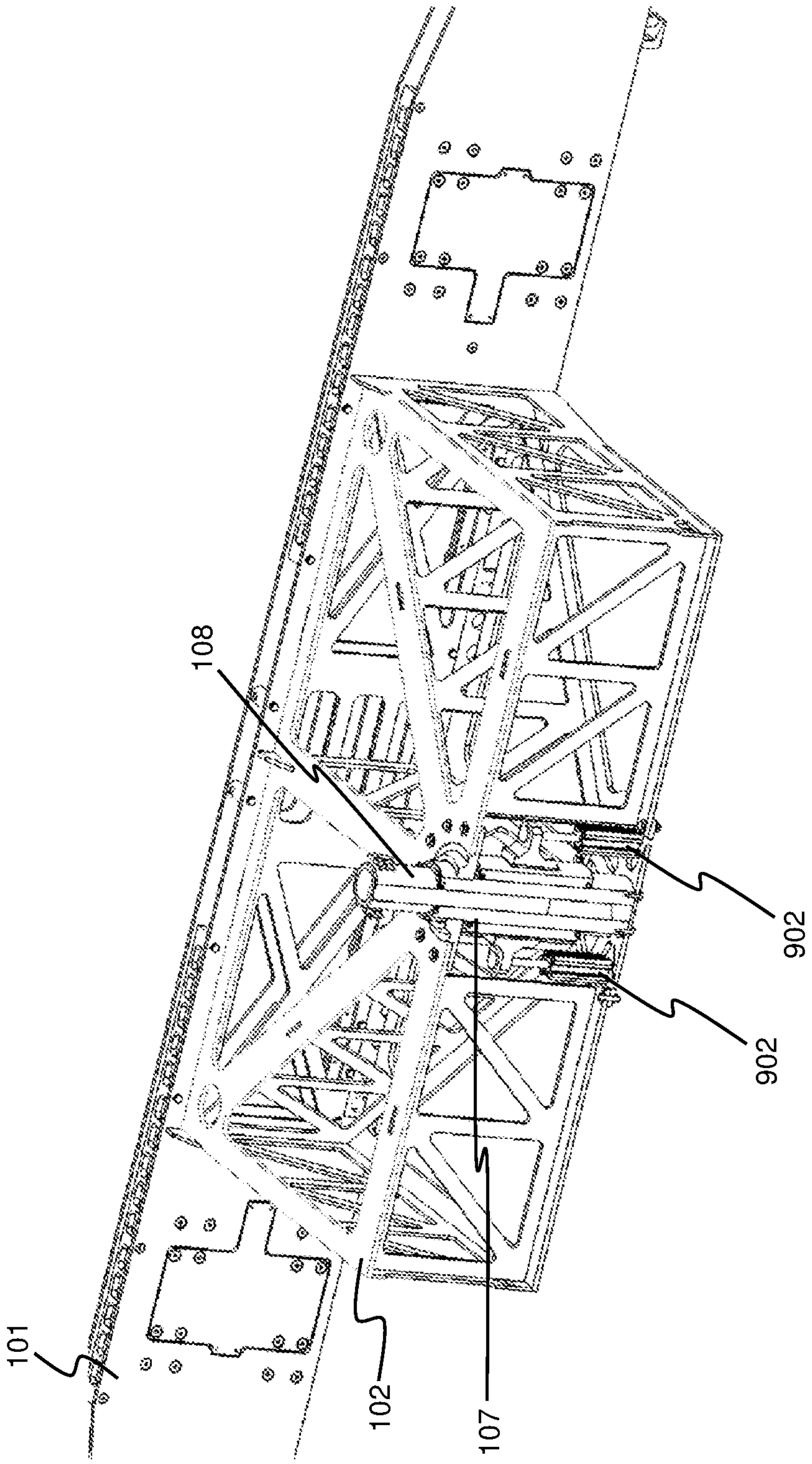
FIG. 9A-9B show schematically details of an embodiment of the invention with an internal hydraulic circuit for safe closing/opening of the supporting elements.
Figure 9B:
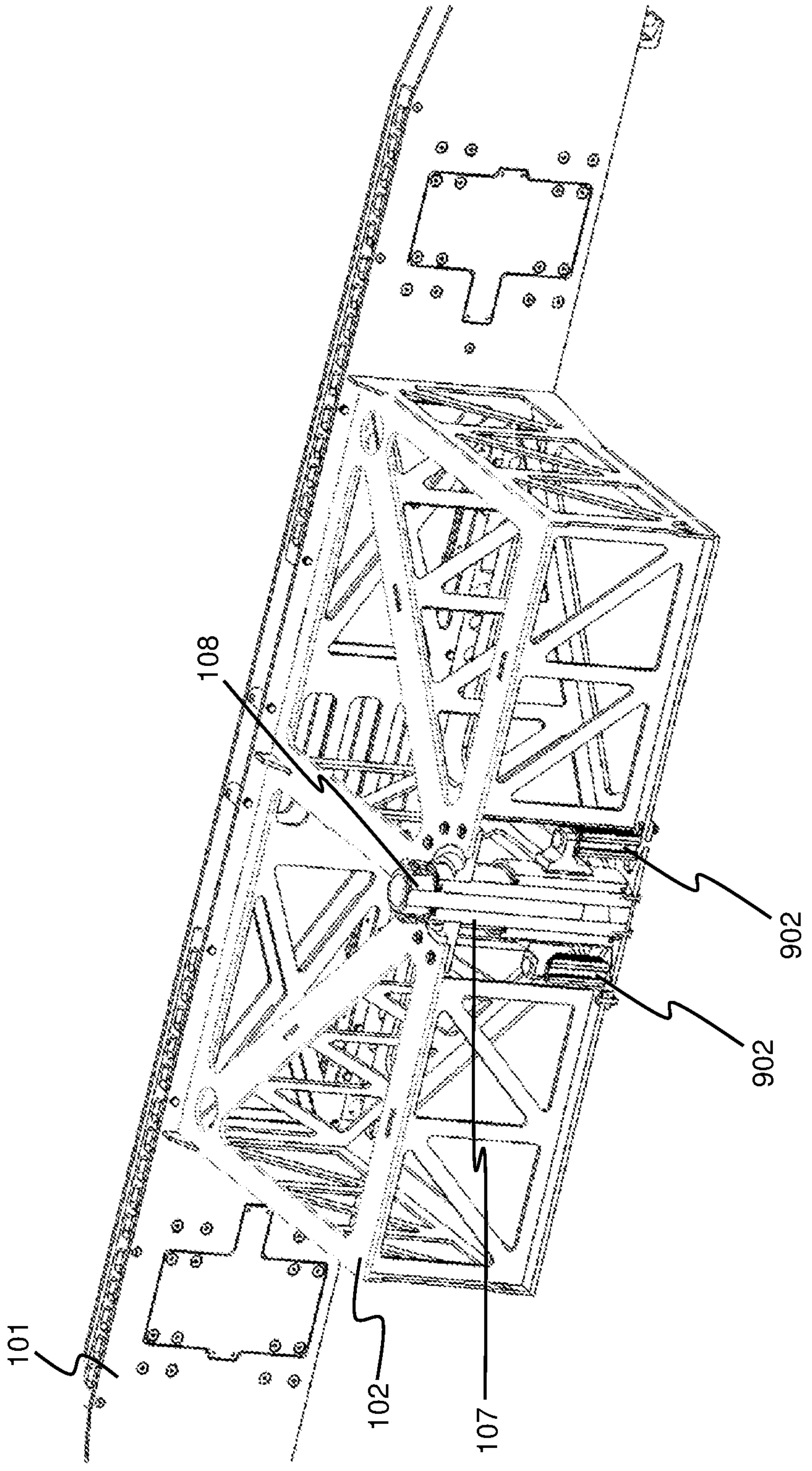

According to the embodiment illustrated in FIG. 7A, the supporting elements have a tapering supporting surface, such as supporting surface 702 for supporting element 113, so that when the supporting elements slide outward, each supporting element slides under a transverse rod and the supporting surface, such as 702, slides toward the rod under which the respective supporting element slides, and in this way raises the steel reinforcement mat. According to the embodiment illustrated in FIG. 7A, a supporting element 113 further comprises a border 704, so that when the supporting surface 702 does not slide toward the rod, the border 704 will slide toward it in such a way that the supporting element 113 clamps and raises the steel reinforcement mat somewhat. The horizontal sliding of the supporting elements under the transverse rods of the steel reinforcement mat may take place pneumatically or hydraulically, or may be accomplished in some other way. FIG. 7A shows for example a hydraulic cylinder 705, which moves the supporting element 113 horizontally. Hydraulic cylinders of this kind are operated by the operator of the hoist to which the hoisting device is coupled. A hoist, for example a building crane, is typically equipped with a hydraulic connection operable by the operator of the building crane. FIG. 7B is a detail drawing of the supporting element 113 with underside 700, tapering supporting surface 702, border 704, and above that a housing with spindle 711, spindle cylinder 712 and spring 713 in one possible embodiment of interlock 106. The spindle cylinder 712 forms part of the supporting element 113 and thus moves horizontally with it—back and forth—propelled by hydraulic cylinder 705. The spindle cylinder 712, spindle 711 and spring 713 are provided from considerations of safety: together they form an interlock 106, which will lock the rod that is carried by the supporting element 113 as soon as said rod is carried, in such a way that the steel reinforcement mat cannot fall during lifting. It is only when a rod breaks at the point where it is carried by a supporting element that the steel reinforcement mat may still be left dangling, but the steel reinforcement mat will not fall, so that even then the situation remains safe. The opening and closing of the spindle 111 must take place automatically, i.e. without the intervention of the operator, to exclude human errors, which create danger. For this reason pump cylinders 902 are provided, as shown in FIG. 9A and FIG. 9B. When the hoisting device is placed on a stack of reinforcement mats or on the ground, the jib will press in the central shaft 108 of the coupling 107. FIG. 9A shows the hoisting device with central shaft 108 pulled out, whereas FIG. 9B shows the hoisting device with central shaft 108 pushed in. When the central shaft 108 is pressed in, the latter will in its turn operate the pump cylinders 902, for example via skates. A rigid connection is shown in FIG. 9, but an embodiment with cam roller and skate offers tolerance with respect to the end position of the central shaft because the central shaft does not then have to be down completely before the spindle cylinders are open. The pump cylinders 902 are connected via an internal hydraulic circuit to the spindle cylinders 712 in the respective supporting elements, such as supporting element 113 in FIG. 7A-7B. The pump cylinder 902 thus pumps oil or some other hydraulic fluid to the spindle cylinder 113 so that spindle cylinder 113 is pushed open and the spindle 711 or closing pin of the interlock 106 is opened. As soon as the pump cylinder 902 is no longer pressed in (as a result of lifting of the hoisting device, withdrawal of the central shaft 108 and upward movement of for example skates) or when the connection between pump cylinder 712 and spindle cylinder 902 is broken, the spring 713 will push the spindle cylinder 712 shut, so that the spindle 711 or closing pin will close the opening of the closing element 713 and a safe situation is created. As an alternative to hydraulic drive of the spindle cylinders, the hoisting device may be provided with an electric battery, one or more electromagnets to pull the spindle cylinders upward, making use of electrical energy of the battery, and a detection mechanism to detect that the hoisting device is on the ground or on the stack of steel reinforcement mats in order to activate the electromagnet. Other forms of energy transmission such as mechanical energy transmission or pneumatic energy transmission may also be considered for converting the downward motion of the hoisting device at the moment of touching the ground or steel reinforcement mat into an upward motion of spindle cylinders which move the supporting elements and conversely, an upward motion of the hoisting device starting from the ground or a stack being converted automatically into a downward motion of the spindle cylinders so that the supporting elements are closed and a safe situation is created during lifting of a steel reinforcement mat.

The four supporting elements in positions 110-113 thus slide outward and then, according to one embodiment, the rods are locked as described above.

Then the device can be lifted, for example by means of a hoist coupled to the device 114 via coupling 107. According to one embodiment, the coupling also allows the device 114 to be rotated when lifted, by a rotator on the hoist. This is illustrated by the sense of rotation 206.

According to one embodiment, when the steel reinforcement mat 202 is raised it can be attracted, at the ends, by a magnet, for example such as an electromagnet 600 that is activated when the steel reinforcement mat 202 is lifted from the stack 401. These optional magnets allow the corners of the steel reinforcement mat to be raised a little so that the hooks or supporting elements can slide under the transverse rods more easily. In other words the magnets contribute to better gripping of the steel reinforcement mats, especially when the corners of a steel reinforcement mat would hang down.

Next, the steel reinforcement mat 202 is placed in a location provided for the purpose, as illustrated in FIG. 5. The steel reinforcement mat 202 can then be set down completely on the surface 502, wherein the supporting elements 110-113 usually touch the surface 502, as illustrated by 500. The supporting elements 110-113 slide back inward horizontally, after the interlock 106 is unlocked, in a sense opposite to 602 and 608 in such a way that the supporting elements 110-113 are located in a mesh and no longer under the rods that were supported.

After this, the device 114 can be lifted again in such a way that the steel reinforcement mat 202 is still lying on the surface 502 and wherein the device 114 can then go and lift the next steel reinforcement mat from the stack 401, in order to place al the steel reinforcement mats from the stack 401 in a required location.

Figure 8A:
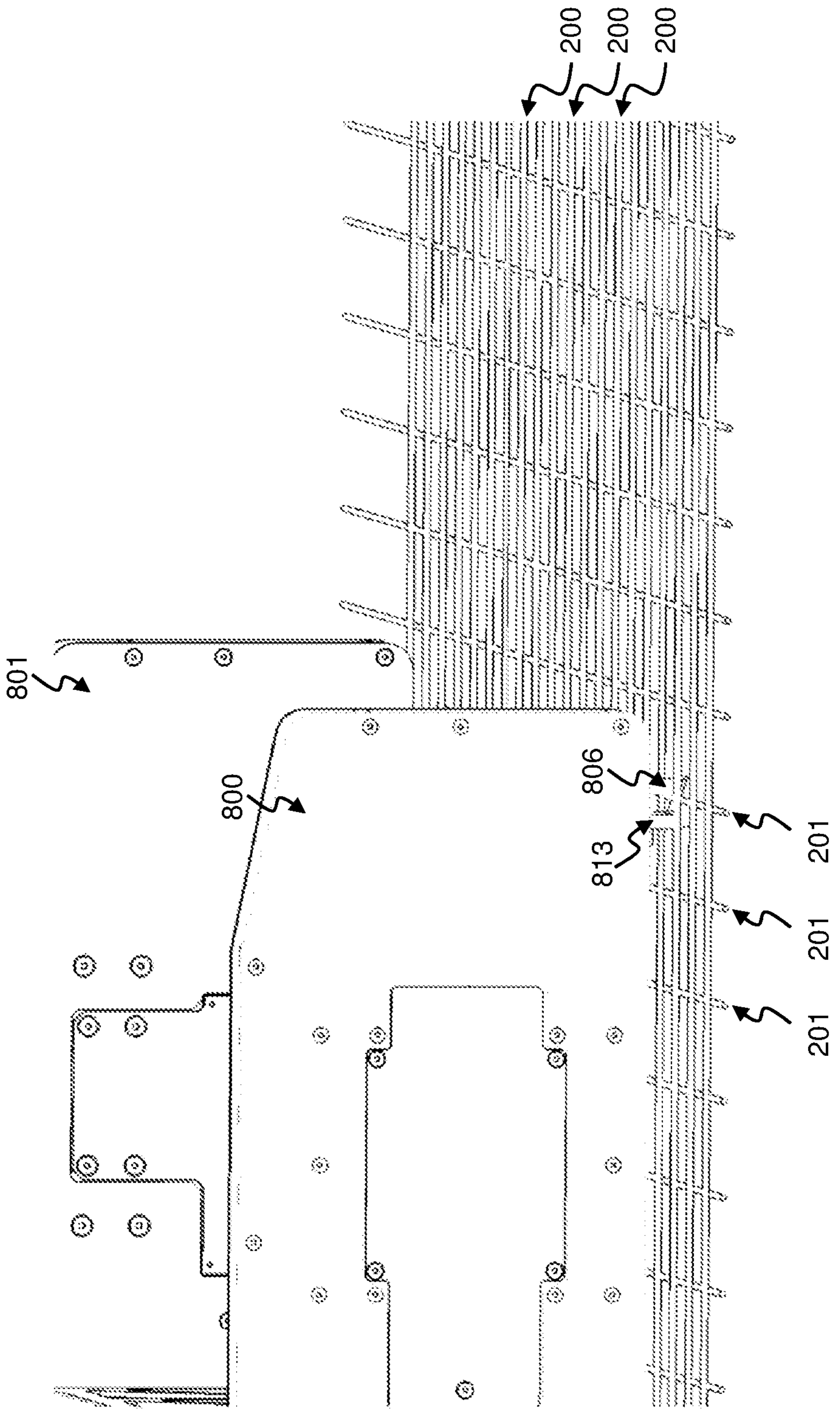
FIG. 8A-8C show schematically details of an embodiment of the invention with a closing pin for interlocking hook-shaped supporting elements.
Figure 8B:
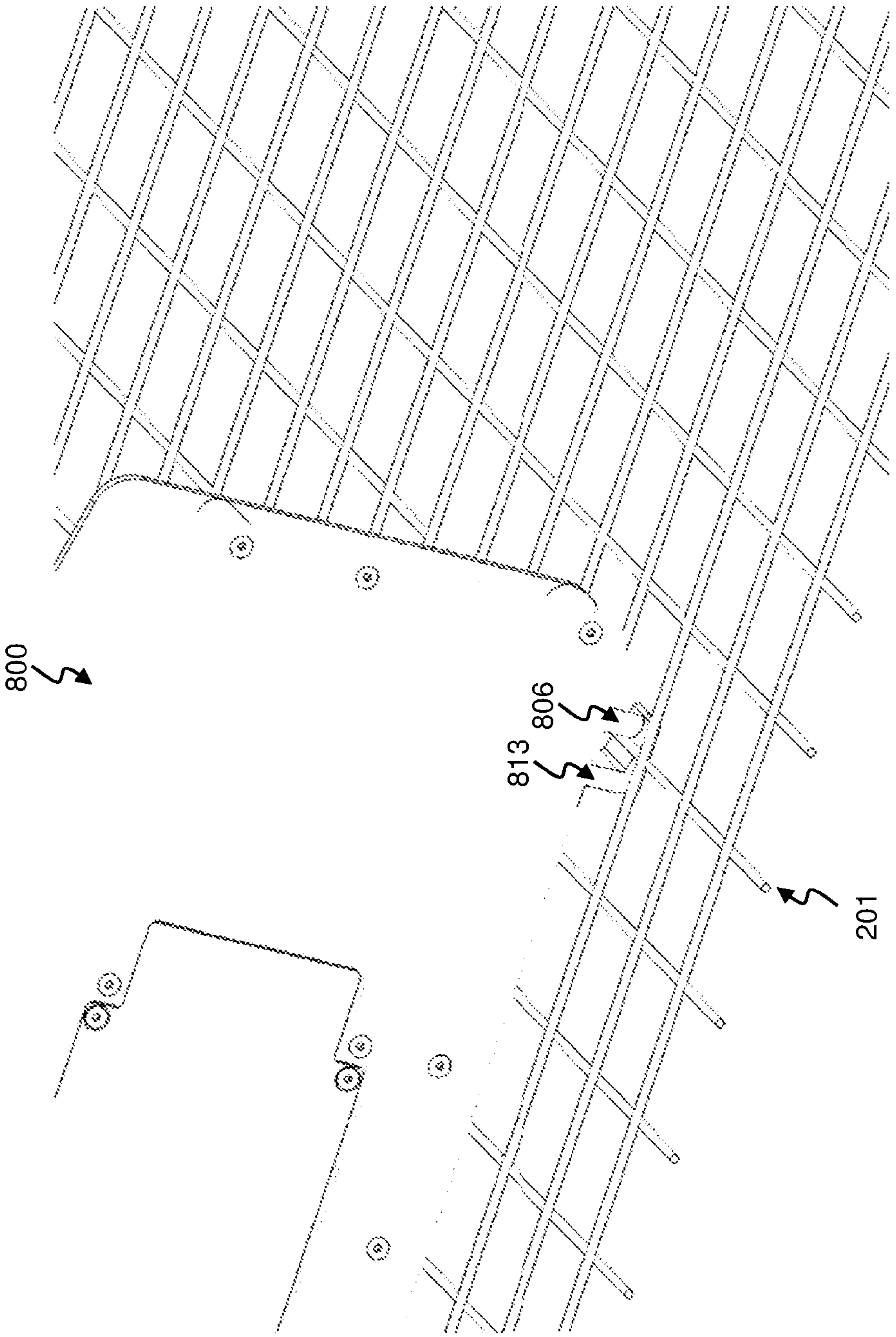
Figure 8C:
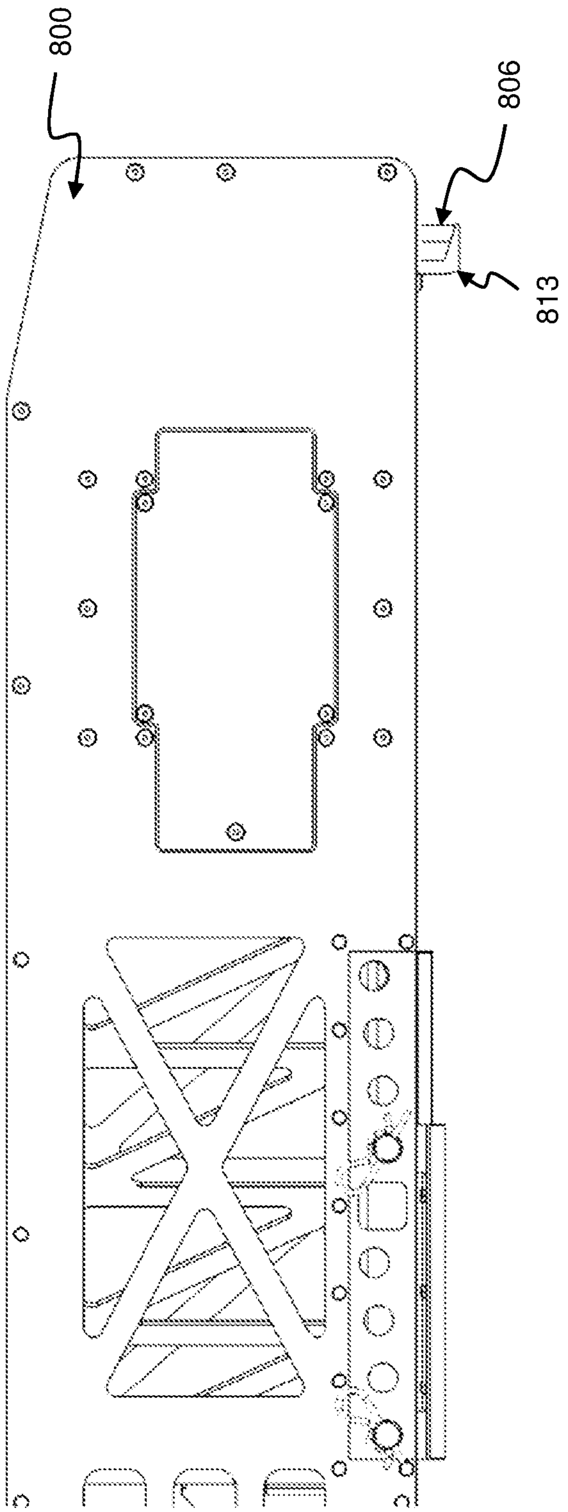

FIG. 8A-8C show in detail an embodiment of the hoisting device with a closing pin 806 for locking a hook-shaped supporting element 803 at the ends of the parallel beams 800 and 801. FIG. 8A and FIG. 8B also show a steel reinforcement mat with longitudinal rods 200 and transverse rods 201. After the hook-shaped supporting elements 803 have been pushed outward and support a transverse rod 201, closing pin 806 is let down vertically until the closing pin 806 reaches the supporting surface (or a recess provided therein). This preferably takes place completely automatically by means of an internal circuit as described above, referring to FIG. 7A-7B and FIG. 9A-9B. In this way, the opening of the hook-shaped supporting element 803 is closed or locked in such a way that the supported transverse rod 201 cannot move out of it during lifting of the steel reinforcement mat. In a variant embodiment, the spindles/closing pins may perform a rotating or pivoting motion instead of a vertical motion in order to close the supporting elements and lock the transverse rods.

Although the present invention has been illustrated on the basis of specific embodiments, it will be clear to a person skilled in the art that the invention is not limited to the details of the foregoing illustrative embodiments, and that the present invention can be implemented with various modifications and adjustments while remaining within the scope of the invention. The present embodiments must therefore be regarded in all aspects as illustrative and not restrictive, wherein the scope of the invention is described by the appended claims and not by the foregoing description, and all modifications that fall within the meaning and scope of the claims are consequently incorporated herein. In other words it is considered that this includes all modifications, variations or equivalents that fall within the scope of the underlying basic principles and whose essential attributes are claimed in this patent application. In addition, the reader of this patent application will understand that the words “comprising” or “comprise” do not exclude other elements or steps, that the word “a” does not exclude a plural, and that a single element may fulfill the functions of various devices that are stated in the claims. Any references in the claims are not to be interpreted as a limitation of the claims in question. The terms “first”, “second”, “third”, “a”, “b”, “c” and the like, when used in the description or in the claims, are used in order to distinguish between similar elements or steps and do not necessarily describe a successive or chronological order. Similarly, the terms “top”, “bottom”, “over”, “under” and such are used for the purpose of description and they do not necessarily refer to relative positions. It is to be understood that these terms are mutually interchangeable in the right circumstances and that embodiments of the invention are able to function according to the present invention in other sequences or orientations than those described or illustrated in the foregoing.

The invention claimed is:

1. A device for lifting a steel reinforcement mat comprising a grid of parallel rods in a first direction and, placed thereon and permanently fastened, parallel rods in a second direction, each according to a predetermined mesh width;

the device comprising a hoisting frame suitable for being secured to a hoist;

the hoisting frame comprising supporting elements on opposite sides positioned in such a way that when the hoisting frame rests on an uppermost steel reinforcement ma of a stack thereof, each supporting element is located in a respective mesh; and in which moreover the supporting elements are configured to slide in the first direction in such a way that during lifting, the supporting elements each with a respective supporting surface exclusively support rods in the second direction of exclusively the uppermost steel reinforcement mat and wherein the supporting elements on the opposite sides slide away in the opposite direction to each other.

2. The device according to claim 1, further comprising a coupling configured to connect the hoisting frame rigidly to the hoist.

3. The device according to claim 1, wherein the distance between the supporting elements is adjustable.

4. The device according to claim 1, wherein a supporting element comprises a border at right angles to one side of its respective supporting surface.

5. The device as according to claim 1, wherein a supporting element further comprises an interlock configured to lock a supported rod.

6. The device according to claim 5, wherein the interlock is a closing pin positioned at right angles on the supporting surface and configured to close the opening of the supporting element in which the supported rod is located.

7. The device according to claim 1, wherein the sliding of the supporting elements takes place hydraulically.

8. The device according to claim 1, further comprising a base configured to be secured to the hoisting frame in such a way that the hoisting frame rests on the steel reinforcement mat exclusively by means of the base.

9. The device according to claim 8, wherein the height of the base is adjustable in such a way that the distance between the underside of the base and the upper side of the supporting surfaces is at least equal to the thickness of the rods in the second direction.

10. The device according to claim 1, further comprising one or more magnets configured to attract the corners of the steel reinforcement mat.

11. The device according to claim 10, wherein the magnet is an electromagnet or a mechanically controlled lifting magnet.

12. The device according to claim 1, wherein the hoisting frame comprises two parallel beams connected by means of a connecting frame comprising the coupling, the parallel beams comprising a supporting element at each end.

13. A hoist comprising the device according to claim 1.

* * * * *